(12) United States Patent
Rabhi

(10) Patent No.: US 11,187,141 B2
(45) Date of Patent: Nov. 30, 2021

(54) IGNITION INSERT WITH AN ACTIVE PRE-CHAMBER

(71) Applicant: Vianney Rabhi, Lyons (FR)

(72) Inventor: Vianney Rabhi, Lyons (FR)

(*) Notice: Subject to any disclaimer, the term of this patent is extended or adjusted under 35 U.S.C. 154(b) by 0 days.

(21) Appl. No.: 16/869,680

(22) Filed: May 8, 2020

(65) Prior Publication Data

US 2020/0362750 A1  Nov. 19, 2020

Related U.S. Application Data

(60) Provisional application No. 62/942,321, filed on Dec. 2, 2019, provisional application No. 62/846,961, filed on May 13, 2019.

(51) Int. Cl.
| | | |
|---|---|---|
| F02B 19/12 | (2006.01) | |
| F02B 19/18 | (2006.01) | |
| F02B 19/02 | (2006.01) | |
| F02F 3/00 | (2006.01) | |
| F02F 1/24 | (2006.01) | |
| F02B 19/10 | (2006.01) | |

(52) U.S. Cl.
CPC .............. *F02B 19/12* (2013.01); *F02B 19/02* (2013.01); *F02B 19/108* (2013.01); *F02B 19/18* (2013.01); *F02F 1/24* (2013.01); *F02F 3/00* (2013.01); *F02B 19/10* (2013.01); *F02B 19/1004* (2013.01); *F02B 19/1009* (2013.01); *F02B 19/1014* (2013.01); *F02B 19/1019* (2013.01); *F02B 19/1071* (2013.01)

(58) Field of Classification Search
CPC ...................................................... F02B 19/12
See application file for complete search history.

(56) References Cited

U.S. PATENT DOCUMENTS

| | | | | |
|---|---|---|---|---|
| 2,674,983 A | * | 4/1954 | Kraus | F02B 19/14 123/261 |
| 2,804,858 A | * | 9/1957 | Schilling | F02B 19/14 123/262 |
| 2,972,987 A | * | 2/1961 | Steidler | F02B 23/04 123/275 |
| 3,220,389 A | * | 11/1965 | Van Rinsum | F02B 19/14 123/268 |

(Continued)

FOREIGN PATENT DOCUMENTS

| | | |
|---|---|---|
| EP | 3001008 A1 | 3/2016 |
| FR | 3060222 A1 | 6/2018 |

(Continued)

*Primary Examiner* — Kevin R Steckbauer
(74) *Attorney, Agent, or Firm* — Nixon & Vanderhye

(57) ABSTRACT

The ignition insert with an active pre-chamber (1) comprises an insert well (72) arranged in a cylinder head (3) of an internal combustion engine (2), said well (72) accommodating a cylindrical insert body (70) which is indexed in rotation and in which are arranged an ignition pre-chamber (71), an insert spark plug well (83) receiving a spark plug (12), and a injector radial orifice (88) which is aligned with a injector lateral well (73) arranged in the cylinder head (3) so as to receive an injector nose (16), said body (70) being terminated by a pre-chamber nose (75) opening into a combustion chamber (5), and being held in the insert well (72) by fixing means (82) cooperating with clamping means (74).

12 Claims, 6 Drawing Sheets

(56) References Cited

U.S. PATENT DOCUMENTS

| | | | | |
|---|---|---|---|---|
| 3,710,764 | A * | 1/1973 | Jozlin | H01T 13/54 123/266 |
| 3,890,940 | A * | 6/1975 | List | F02B 23/04 123/293 |
| 4,127,095 | A * | 11/1978 | Noguchi | F02B 19/12 123/283 |
| 4,248,189 | A * | 2/1981 | Barber | F02B 19/1004 123/169 PA |
| 4,294,209 | A * | 10/1981 | Eisele | F02B 19/14 123/293 |
| 4,319,552 | A * | 3/1982 | Sauer | H01T 13/54 123/297 |
| 5,081,969 | A * | 1/1992 | Long, III | F02B 19/1085 123/274 |
| 5,791,374 | A * | 8/1998 | Black | F02M 61/188 137/519.5 |
| 7,069,901 | B2 * | 7/2006 | Shiraishi | F02B 17/005 123/261 |
| 8,720,411 | B2 * | 5/2014 | Redtenbacher | F02B 19/108 123/286 |
| 8,857,405 | B2 * | 10/2014 | Attard | F02B 19/10 123/261 |
| 9,371,771 | B2 * | 6/2016 | Lee | F02M 21/0275 |
| 9,739,193 | B2 * | 8/2017 | Cheiky | F02B 43/10 |
| 10,041,402 | B2 * | 8/2018 | Schulz | F01C 21/106 |
| 10,116,122 | B2 * | 10/2018 | Rabhi | F02B 19/10 |
| 10,550,757 | B2 * | 2/2020 | Rabhi | F02B 19/18 |
| 10,890,133 | B2 * | 1/2021 | Rabhi | F02B 19/1071 |
| 2012/0103302 | A1 * | 5/2012 | Attard | F02B 19/10 123/260 |
| 2013/0180498 | A1 * | 7/2013 | Rabhi | F02D 41/3023 123/295 |
| 2014/0158083 | A1 * | 6/2014 | Lee | F02B 19/12 123/275 |
| 2014/0165958 | A1 * | 6/2014 | Lee | F02M 21/0275 123/260 |
| 2014/0331960 | A1 * | 11/2014 | Lee | F02B 19/06 123/275 |
| 2015/0020764 | A1 * | 1/2015 | Cheiky | F02B 19/1014 123/260 |
| 2017/0328266 | A1 * | 11/2017 | Bar | F02M 61/14 |
| 2017/0328274 | A1 * | 11/2017 | Schulz | F02B 19/12 |
| 2018/0166862 | A1 * | 6/2018 | Rabhi | F02B 19/12 |
| 2019/0072025 | A1 * | 3/2019 | Rabhi | F02B 19/02 |
| 2019/0085776 | A1 * | 3/2019 | Tate, Jr. | F02D 19/081 |
| 2020/0080508 | A1 * | 3/2020 | Rabhi | F02B 19/1061 |
| 2020/0123963 | A1 * | 4/2020 | Anderson | F02B 19/1009 |

FOREIGN PATENT DOCUMENTS

| | | |
|---|---|---|
| FR | 3061743 A1 | 7/2018 |
| FR | 3085718 A1 | 3/2020 |
| WO | 2018/104681 A1 | 6/2018 |

* cited by examiner

IGNITION INSERT WITH AN ACTIVE PRE-CHAMBER

FIELD OF THE INVENTION

The present invention relates to an ignition insert with an active pre-chamber which makes it possible to accommodate an active pre-chamber in the cylinder head of an internal combustion engine in a small space and in a minimally intrusive manner.

BACKGROUND OF THE INVENTION

There are many concepts of active pre-chambers, the latter being used as an ignition means for igniting a main charge in the combustion chamber of an internal combustion engine.

The term "active" pre-chamber is commonly used to describe pre-chambers into which opens, in addition to a known electric spark plug, at least one fuel injector with or without an air injector or at least one fuel-air mixture injector.

For example, the concept is known of a pre-chamber known as "Turbulent Jet Ignition", patented and developed by the "Mahle" company. This concept—which was the subject of patent EP 3 001 008 A1 published on 30 Mar. 2016—provides for a pre-chamber into which opens an electric spark plug on the one hand and a fuel injector on the other hand. Said pre-chamber is essentially designed to ignite main charges that are highly diluted with air, i.e. low in gasoline and rich in oxygen.

Patent application No. FR 3 061 743 published on Jul. 13, 2018, for a valve-controlled ignition pre-chamber and patent application No. FR 3 060 222 published on Jun. 15, 2018, for a spark plug with electrode-shuttle are also known. Both applications are the property of the applicant and have the particularity of separating the pre-chamber from the main chamber by means of a valve or an electrode-shuttle. This innovative configuration offers many possibilities compared to conventional pre-chambers which are in permanent communication with the engine combustion chamber.

It should be noted that patent applications No. FR 3 061 743 and No. FR 3 060 222 gave rise to an improvement patent application No. 18 58111 dated Sep. 10, 2018. The latter application is owned by the applicant and relates to the magnetic return of the valve or of the electrode-shuttle.

Generally speaking, all pre-chamber ignition devices provide that a pilot charge mainly composed of air and fuel is first introduced into the pre-chamber. Then said pilot charge is ignited by a spark plug. As it burns, the pressure of the pilot charge is increased to the extent that the pilot charge is ejected at high temperature and high speed in the form of torches of burning gas into the three-dimensional space of the engine combustion chamber. As they pass through the volume of said chamber, said torches ignite the main charge contained therein.

Compared to a simple spark plug, the much higher ignition power of the torches combined with the formation of local turbulence of high intensity and short duration allows the rapid burning of main charges of air and fuel highly diluted with additional atmospheric air or with preferably pre-cooled recirculated exhaust gases.

The combination of powerful ignition and highly diluted charges enables torch ignition pre-chambers to significantly reduce the fuel consumption of spark ignition internal combustion engines, in particular by limiting pumping and wall heat losses thereof. The main charge being highly diluted and its combustion being rapid, said charge is also not very sensitive to knocking, which makes it possible to provide the engine receiving it with a high volumetric ratio and an optimum ignition advance, these two particularities making it possible to confer a high efficiency on the thermodynamic cycle performed.

One of the difficulties in installing the active ignition pre-chambers is the space occupied by the spark plug and the injector which the said pre-chambers receive, and which open into the very small volume of the said pre-chambers.

In addition, it is preferable to avoid any connecting duct between the pre-chamber and the injector nose, as illustrated in patent application No. FR 3 061 743, as it is difficult to propagate the flame previously initiated in the pre-chamber by the spark plug in such a duct, the latter being cold, blocking the flame, forming a trap for unburnt residues, and strongly cooling the pilot charge due to the large internal surface that it exposes in relation to its volume.

Active pre-chambers thus pose a problem of integration in internal combustion engines, since the spark plug and the injector are usually placed next to each other or almost next to each other, as shown for example by patent EP 3 001 008 A1.

This arrangement results in a substantial radial space requirement for the pre-chamber, spark plug and injector assembly. Moreover, this arrangement makes it difficult to create very small volume pre-chambers without the internal surface/volume ratio of the pre-chambers being very large and favours excessive cooling of the pilot charge gases once the latter have been heated to high temperature.

It should also be noted that the large dimensions of the various components of the active pre-chamber reduce the space available to house the water chambers which cool the cylinder head, the intake and exhaust ducts of the internal combustion engine and the camshafts of the said engine.

In addition, cooling of the pre-chamber becomes potentially difficult to achieve if it is not in direct contact with the cooling water circulating in the water chambers of the cylinder head.

It should also be noted that installing an active pre-chamber in a pre-existing engine requires extensive modifications to the cylinder head, as the cylinder head cannot accommodate the active pre-chamber without substantial modifications. It is therefore necessary to support heavy investments to modify the cylinder head and to ensure its industrial production.

SUMMARY OF THE INVENTION

For resolving these various problems and disadvantages inherent in the installation of active pre-chambers in reciprocating internal combustion engines with spark or compression ignition, according to the invention and according to a particular embodiment, the ignition insert with active pre-chamber allows:

To house an active pre-chamber in the spark plug or injector well of practically any spark-ignition or diesel engine, that is to say by minimizing the modifications to which the cylinder head must be subjected;

To cool the said pre-chamber by placing the outer surface thereof directly in contact with the cooling water which circulates in the water chambers of the cylinder head which receives it;

To produce active pre-chambers of very small volume and which offer a small surface/volume ratio, so that the heat exchanges between the gases contained in said pre-chambers and the internal wall of said pre-chambers remain limited;

Taking the above into account, the ignition insert with an active pre-chamber according to the invention makes it possible to meet an unsatisfied need of being capable to implant an active pre-chamber efficiently and at a lower cost on any type of reciprocating internal combustion engine.

The ignition insert with an active pre-chamber according to the invention is expected to be inexpensive to manufacture in large series, in order to remain compatible with the economic constraints of most of the applications for which it is intended, including automotive applications.

It is understood that the ignition insert with an active pre-chamber according to the invention can be applied to any rotary or reciprocating internal combustion engine, whatever the type, whatever the gaseous, liquid or solid fuel it uses, and whether its main charge is diluted with cooled or uncooled EGR, with a neutral gas of any kind, or with a gas rich in oxygen or any other oxidant.

It is also understood that the pilot charge intended to ignite the main charge of any spark ignition engine which receives the ignition insert with an active pre-chamber according to the invention may contain a fuel and/or oxidant different from the fuel and/or oxidant which constitutes said main charge.

The ignition insert with an active pre-chamber according to the present invention is intended for an internal combustion engine, the latter comprising a cylinder head which covers a cylinder to form with a piston a combustion chamber into which a main charge can be introduced, said cylinder head housing an ignition pre-chamber into which a spark plug and an injector nose of at least one injector open and into which a pilot charge can be introduced; said pre-chamber can communicate with the combustion chamber successively via a gas ejection conduit and via at least one gas ejection orifice which opens into said chamber via a pre-chamber nose, said insert comprising:

At least one insert well arranged in the cylinder head and having fixing means, said well opening on the one hand, outside the cylinder head via a large-diameter insert introduction orifice, and on the other hand, in the combustion chamber via a smaller-diameter pre-chamber nose orifice, the two said diameters being connected to each other by at least one insert support shoulder;

At least one cylindrical insert body made up of one or more parts and in which the ignition pre-chamber and the gas ejection conduit are notably arranged, said body being housed with little play in the insert well, being indexed in rotation relative to the cylinder head, and ending with the pre-chamber nose which crosses the orifice of the pre-chamber nose, while said body has an insert support surface which bears directly or indirectly on the insert support shoulder;

At least one insert spark plug well arranged in the cylindrical insert body, parallel to the axis of said body or at a closed angle with respect to said axis and at the center or near the center of said body, said spark plug well opening on the one hand, at the end of the cylindrical insert body which is axially opposite the pre-chamber nose, and on the other hand, in the ignition pre-chamber, said spark plug well receiving the spark plug ignition or injector nose 16;

At least one injector radial orifice arranged radially in the cylindrical insert body but not necessarily perpendicular to the latter and in which is housed the end of the injector nose or the spark plug, said orifice connecting the ignition pre-chamber and/or the gas ejection conduit with the external surface of the cylindrical insert body;

At least one injector lateral well arranged in the cylinder head, said well receiving the injector nose body or the spark plug and connecting the outside of the cylinder head with the insert well while the radial orifice of injector is aligned with said well so that the end of the injector nose or of the spark plug opens into the ignition pre-chamber and/or the gas ejection conduit, successively passing through the injector lateral well and the injector radial orifice;

And clamping means cooperating with the fixing means in order to directly or indirectly maintain the insert support surface of the cylindrical insert body pressed against the insert support shoulder.

The ignition insert with an active pre-chamber according to the present invention comprises a pre-chamber nose which accommodates a stratification valve which is pressed either against the end of the gas ejection conduit to close the latter sealingly, either, against a valve seat on the chamber side to form with the gas ejection conduit a pre-chamber for ignition by torch which simultaneously communicates on the one hand, with the ignition pre-chamber via the gas ejection conduit, and on the other hand, with the combustion chamber via the gas ejection orifice.

The ignition insert with an active pre-chamber according to the present invention comprises a source of magnetic field which is positioned on the cylindrical insert body and which produces a magnetic field which tends to keep the stratification valve pressed against the end of the gas ejection conduit.

The ignition insert with an active pre-chamber according to the present invention comprises a gas ejection conduit which is made of a magnetic material and which forms at its contact with the stratification valve a gas ejection tube whose outside diameter is less than that of said valve, said tube being tightly enclosed in a non-magnetic sleeve made of a non-magnetic material.

The ignition insert with an active pre-chamber according to the present invention comprises a pre-chamber nose which consists of an attached nose which covers the gas ejection conduit, the gas ejection orifice being arranged in said attached nose.

The ignition insert with an active pre-chamber according to the present invention includes a space forming an insert cooling water chamber which is formed between the cylindrical insert body and the insert well.

The ignition insert with an active pre-chamber according to the present invention comprises a injector lateral well which consists of a perforated or non-continuous bore which communicates along its length with at least one cylinder head cooling water chamber that includes the cylinder head.

The ignition insert with an active pre-chamber according to the present invention comprises an insert clamping ferrule which bears on the clamping face by ferrule via a compression spring.

The ignition insert with an active pre-chamber according to the present invention comprises clamping means which consist of at least one insert clamping ferrule having an external ferrule thread cooperating with the means for fixing the insert well which consist of a well internal thread, said ferrule being centrally bored for allowing the spark plug to pass through.

The ignition insert with an active pre-chamber according to the present invention comprises an insert support surface which directly or indirectly forms a ball joint connection with the insert support shoulder, while the cylindrical insert body directly or indirectly forms a ball joint connection with the clamping means.

The ignition insert with an active pre-chamber according to the present invention comprises clamping means which bear on the cylindrical insert body by means of a ball-joint sliding washer which can move radially either relative to the cylindrical insert body, or relative to the clamping means.

The ignition insert with an active pre-chamber according to the present invention comprises a ball-joint sliding washer which is flexible and which forms a restraint spring.

The ignition insert with an active pre-chamber according to the present invention comprises an injector nose which is held pressed in the injector radial orifice and against the cylindrical insert body by elastic clamping means which bear on the injector on the one hand, and on the cylinder head on the other hand.

The ignition insert with an active pre-chamber according to the present invention comprises elastic clamping means which consist of a flange which bears on the injector on the one hand, and which is connected to the cylinder head by at least a flange screw on the other hand.

The description which follows with reference to the appended drawings, supplied by way of non-limiting examples, will make it possible to better understand the invention, the features thereof, and the advantages which it is capable of providing:

DESCRIPTION OF THE PREFERRED EMBODIMENTS

Figure 1:
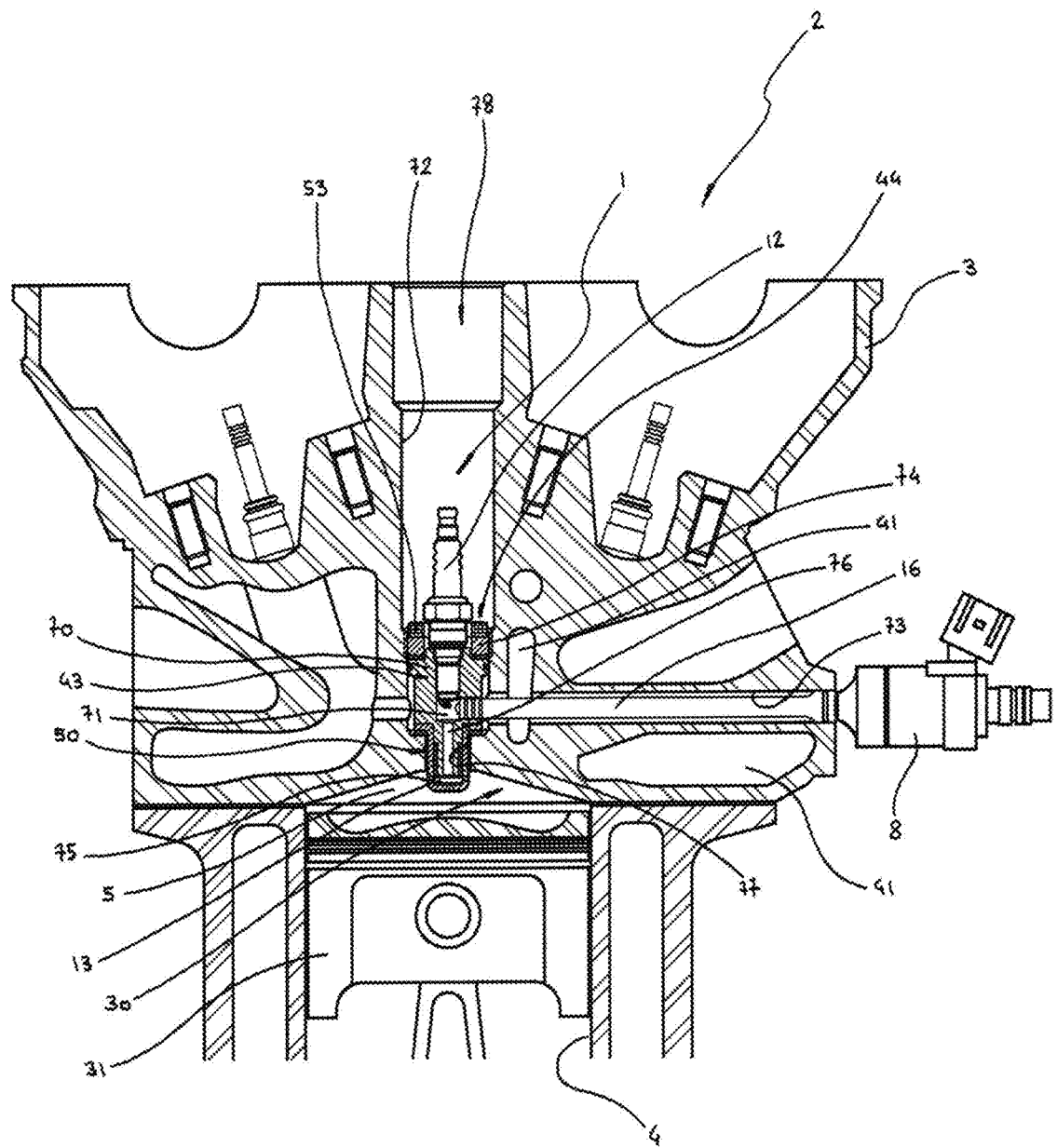
FIG. 1 is a schematic sectional view of the ignition insert with an active pre-chamber according to the invention as it can be installed in the cylinder head of an internal combustion engine, said insert receiving, as an alternative embodiment, a valve stratification kept pressed against the end of the gas ejection conduit by a magnetic field produced by a permanent magnet.

FIGS. 1 to 6 show the ignition insert with an active pre-chamber 1 according to the invention, various details of its components, its alternative embodiments, and its accessories.

The ignition insert with active pre-chamber 1 is particularly provided for an internal combustion engine 2, the latter comprising a cylinder head 3 which covers a cylinder 4 to form with a piston 31 a combustion chamber 5 into which can be introduced a main load 30.

As can be seen in FIGS. 1, 2, 5 and 6, the cylinder head 3 houses an ignition pre-chamber 71 in which open a spark plug 12 and an injector nose 16 of at least one injector 8 and into which a pilot charge 9 can be introduced, said pre-chamber 71 being capable to communicate with the combustion chamber 5 successively via a gas ejection conduit 76 and via at least one gas ejection orifice 24 which opens into said chamber 5 via a pre-chamber nose 75.

As can be seen in FIGS. 1, 2, 5 and 6, the ignition insert with an active pre-chamber 1 according to the invention comprises at least one insert well 72 arranged in the cylinder head 3. Said insert well 72 comprises fixing means which consist of a well internal thread 82 over part of its length. In addition, said well 72 opens outside of the cylinder head 3 via an insert insertion orifice 78 of large diameter, on the one hand, and into the combustion chamber 5 via a pre-chamber nose orifice 77 of smaller diameter, on the other hand, the two said diameters being connected to each other by at least one insert support shoulder 79 which may for example be planar or conical.

As can be seen in FIGS. 1 to 6, the ignition insert with an active pre-chamber 1 according to the invention has at least one cylindrical insert body 70 consisting of one or more parts and in which are notably arranged the ignition pre-chamber 71 and the gas ejection conduit 76.

The cylindrical insert body 70 is housed with little play in the insert well 72, is indexed in rotation relative to the cylinder head 3, and ends with the pre-chamber nose 75 which passes through the pre-chamber nose orifice 77. The cylindrical insert body 70 also has an insert support surface 80 which directly or indirectly bears on the insert support shoulder 79.

It is noted that when the cylindrical insert body 70 is introduced into the insert well 72 through the insert introduction orifice 78, said body 70 is stopped in its movement when the insert support shoulder 79 comes into contact with the insert support surface 80.

It is noted that a support gasket 25 can be provided between the insert support surface 80 and the insert support shoulder 79 which provides a seal between the insert well 72 and the combustion chamber 5. Said seal 25 can be metallic like annealed copper or be of any other type known to those skilled in the art.

Figure 2:
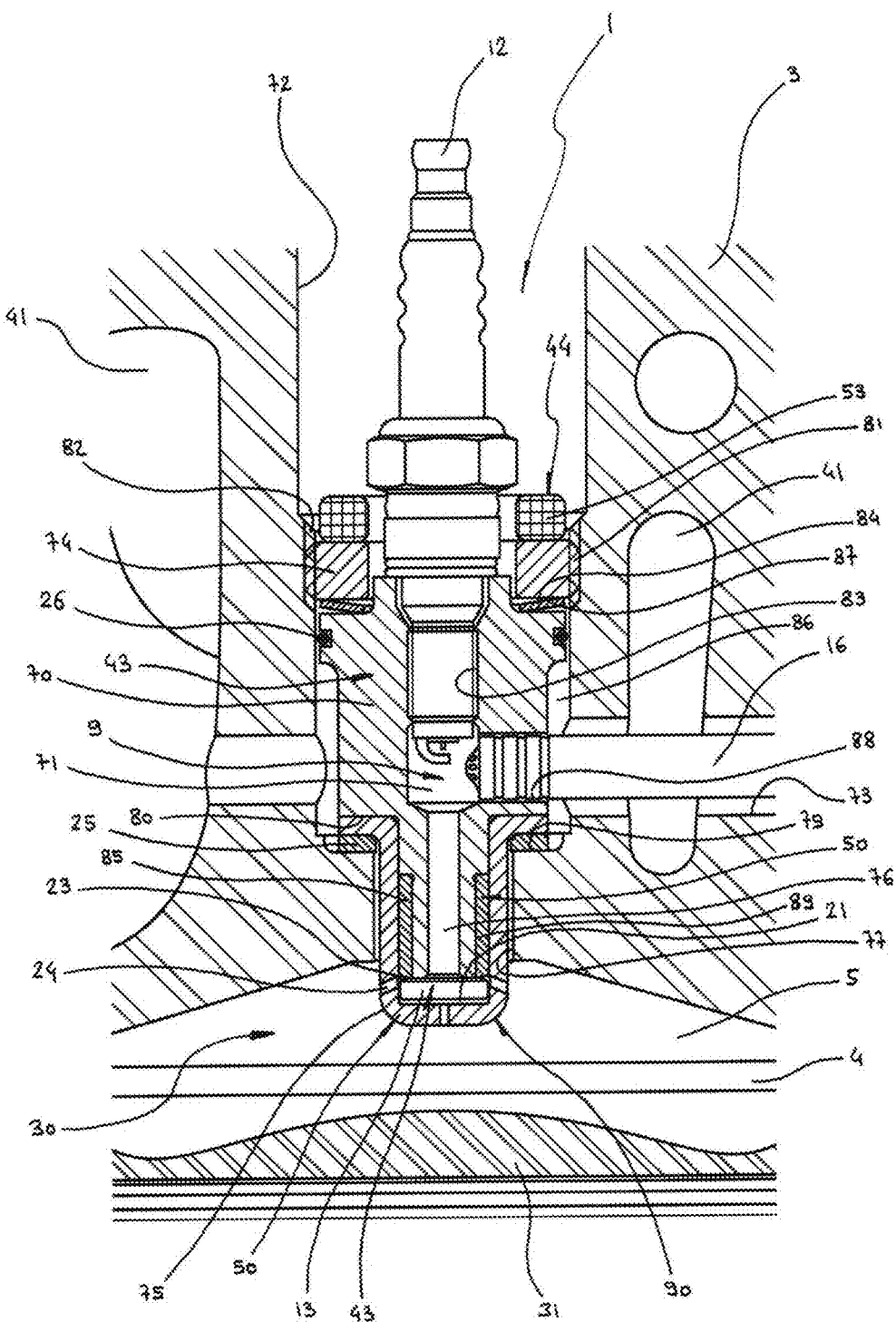
FIG. 2 is a schematic sectional view framed on the cylindrical insert body of the ignition insert with an active pre-chamber according to the invention and according to the alternative embodiment illustrated in FIG. 1.
Figure 4:
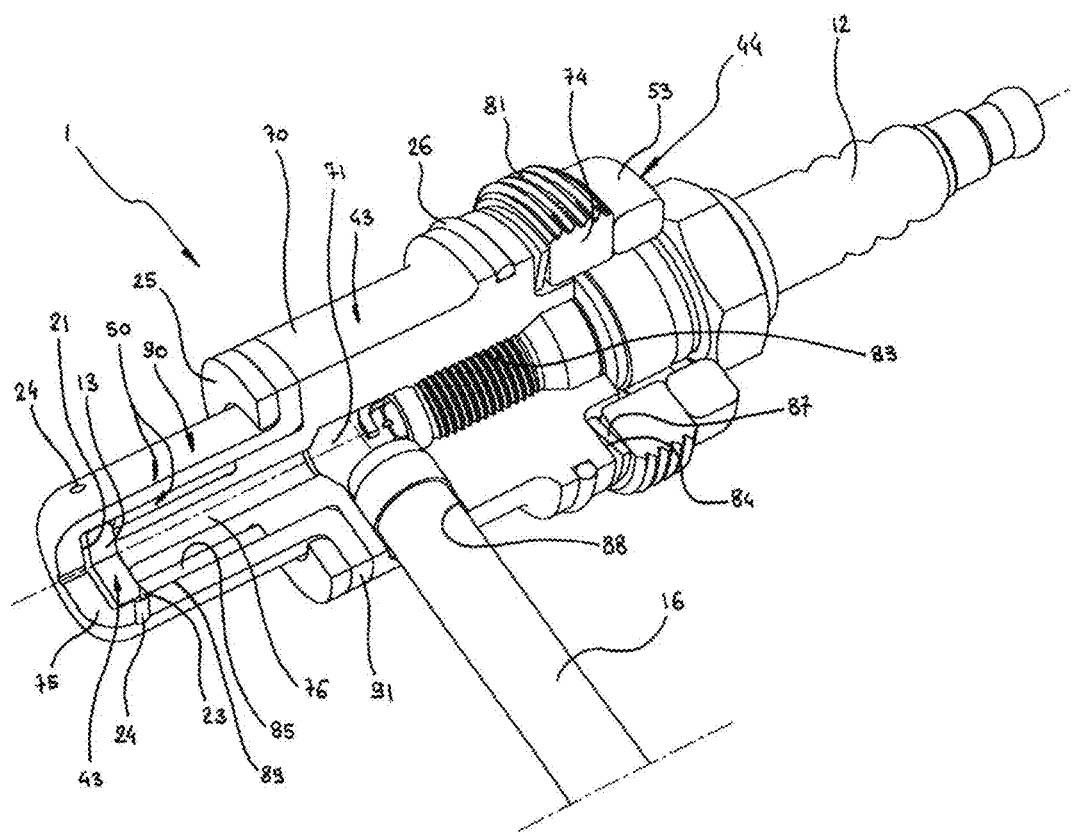
FIG. 4 is a three-dimensional cutaway view of the cylindrical insert body of the ignition insert with a pre-chamber according to the invention and of the main components with which said body cooperates, this according to the alternative embodiment illustrated in FIG. 1 which provides a stratification valve and a permanent magnet.
Figure 5:
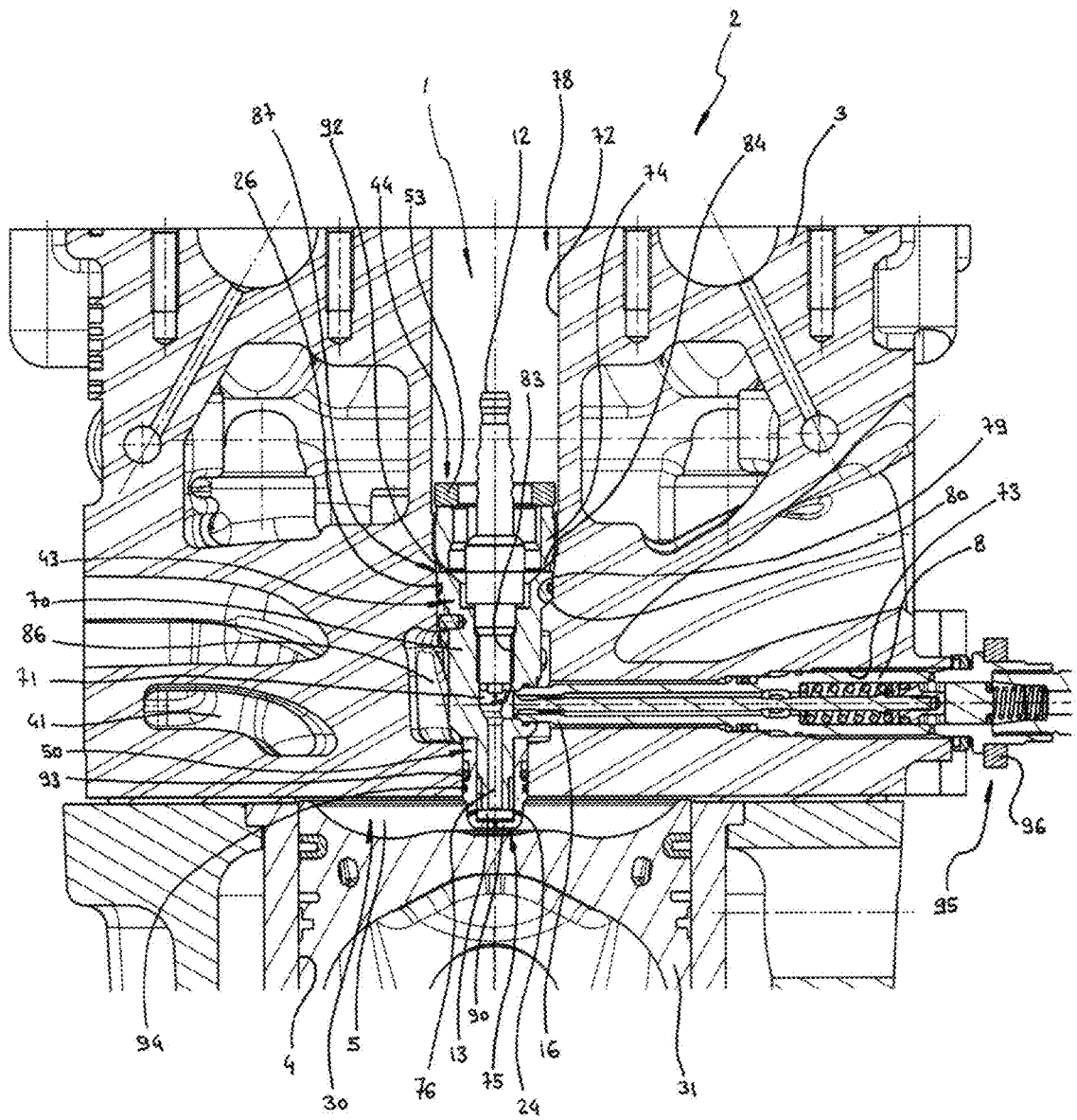
FIG. 5 is a schematic sectional view of the cylindrical insert body of the ignition insert with an active pre-chamber according to the invention as it can be installed in the cylinder head of an internal combustion engine, the insert support surface forming a ball joint connection with the insert support shoulder while the cylindrical insert body forms a ball joint connection with the clamping means by means of a ball-joint sliding washer.

As can be seen particularly in FIGS. 2, 4 and 5, the ignition insert with active pre-chamber 1 according to the invention has at least one insert spark plug well 83 arranged in the cylindrical insert body 70, parallel to the axis of said body 70 or at a closed angle with respect to said axis and at the center or near the center of said body 70, said spark plug well 83 opening at the end of the cylindrical insert body 70 which is axially opposite the pre-chamber nose 75, on the one hand, and in the ignition pre-chamber 71, on the other hand. The insert spark plug well 83 receives the spark plug 12 or the injector nose 16.

Figure 3:
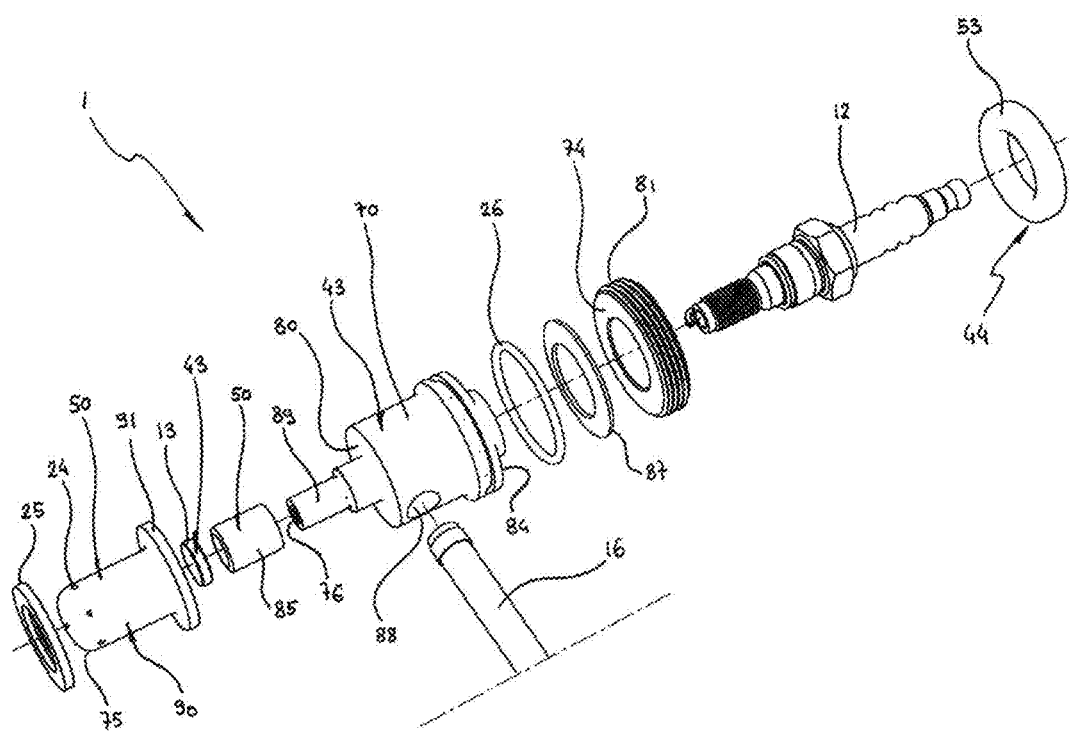
FIG. 3 is an exploded three-dimensional view of the cylindrical insert body of the ignition insert with a pre-chamber according to the invention and of the main components with which said body cooperates, this according to the alternative embodiment illustrated in FIG. 1 which provides a stratification valve and a permanent magnet.

It is to be noted, particularly in FIGS. 2 to 4, that the ignition insert with active pre-chamber 1 according to the invention comprises at least one injector radial orifice 88 arranged radially in the cylindrical insert body 70 but not necessarily perpendicular to the latter and in which is housed the end of the injector nose 16 or the spark plug 12.

Said orifice 88 connects the ignition pre-chamber 71 and/or the gas ejection conduit 76 with the external surface of the cylindrical insert body 70 while a seal can be provided between the injector radial orifice 88 and the injector nose 16 which takes the form of a segment, a seal or any other means known to those skilled in the art, and which prevents any leakage of liquid or gas between the ignition pre-chamber 71 and/or the gas ejection conduit 76 and the external surface of the cylindrical insert body 70.

It should also be noted that the injector radial orifice 88 and the injector nose 16 may constitute a ball joint connection allowing a small angular clearance between said orifice 88 and said nose 16.

As can be seen in FIGS. 1, 2, 5 and 6, the ignition insert with an active pre-chamber 1 according to the invention comprises at least one injector lateral well 73 arranged in the cylinder head 3 in one or more parts according to the arrangement of the material of the cylinder head 3 crossed.

Said well 73 receives the injector nose body 16 and, as the case may be, all or part of the other constituents of the injector 8, or the spark plug 12. Said well 73 connects the outside of the cylinder head 3—that is to say for example the intake ducts of the internal combustion engine 2—with the insert well 72.

It is to be noted that the injector radial orifice 88 is aligned with the injector lateral well 73 so that the end of the injector nose 16 or of the spark plug 12 opens into the ignition pre-chamber 71 and/or the gas ejection conduit 76 successively passing through the injector lateral well 73 and the injector radial orifice 88.

It is to be noted that the cylindrical insert body 70 is deemed to be correctly indexed in rotation relative to the cylinder head 3 when the injector nose 16 is simultaneously housed in the injector lateral well 73 and in the injector radial orifice 88.

It is also noted that a seal can advantageously be provided between the injector lateral well 73 and the injector nose 16, said seal taking the form of a segment, a seal or any other known means of those skilled in the art, and said seal isolating all or part of the interior of the injector lateral well 73 from the exterior of the cylinder head 3.

It will also be noted that the injector lateral well 73 on the one hand, and the injector nose body 16 or even any other constituent part of the injector 8 on the other hand, can constitute a ball joint connection allowing a small angular clearance between said lateral well 73 and said injector 8.

Figure 6:
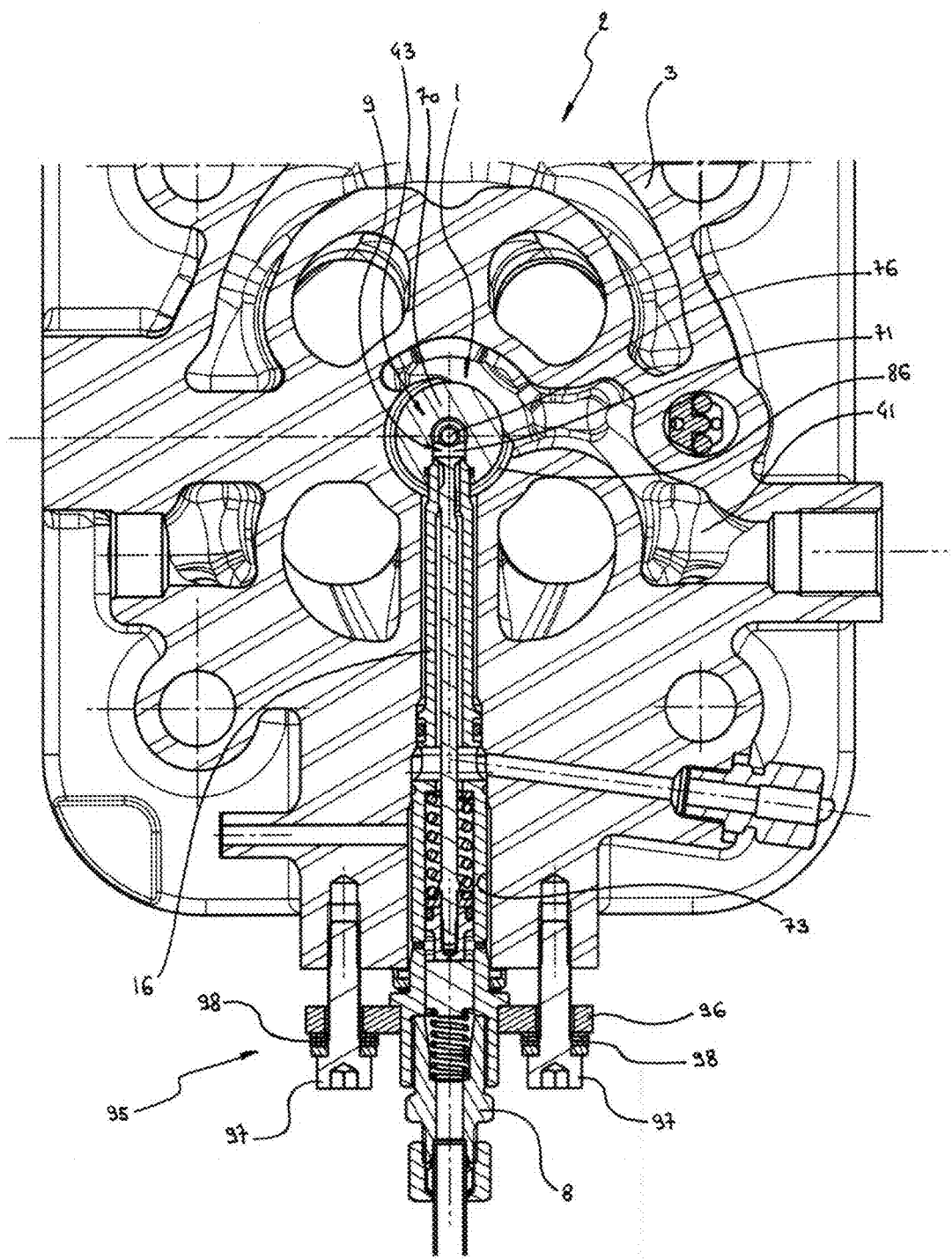
FIG. 6 is a schematic sectional view of FIG. 5 seen from above.

It is to be noted in FIGS. 1, 5 and 6 that the injector lateral well 73 can be housed in the foundry of the cylinder head 3 at the intake ports of the internal combustion engine 2. This location is slightly disturbing for gas flow but advantageous in terms of architecture.

In this case, the inlet of the injector lateral well 73 can be provided so as to be fairly deep in the cylinder head so that only the injector nose body 16 passes through the intake ports.

As seen in FIGS. 1 to 5, the ignition insert with active pre-chamber 1 according to the invention comprises clamping means which consist of at least one insert clamping ferrule 74 which has a ferrule outer thread 81 which cooperates with the well inner thread 82.

The insert clamping ferrule 74 directly or indirectly bears on a clamping face 84 for clamping by the ferrule, which the cylindrical insert body 70 exhibits in order to directly or indirectly maintain the insert support surface 80 of said body 70 pressed against the insert support shoulder 79.

As shown in FIGS. 1 to 5, the insert clamping ferrule 74 is centrally bored to allow the spark plug 12 to pass through.

It will be noted that the insert clamping ferrule 74 can advantageously have a wrench engaging section allowing it to be rotated in order to tighten it; said wrench engaging section can consist of notches, orifices, or a female or male shape of any geometry whatsoever complementary with a shape presented by a tightening wrench.

As shown in FIGS. 1 to 5, the pre-chamber nose 75 can house a stratification valve 13 which is pressed either against the end of the gas ejection conduit 76 to sealingly close the latter, or against a valve seat on the chamber side 21 to form with the gas ejection conduit 76 a pre-chamber 23 for ignition by torch which communicates simultaneously with the ignition pre-chamber 71 via the gas ejection conduit 76, on the one hand, and with the combustion chamber 5 via the gas ejection orifice 24, on the other hand.

As explained in patent application No. FR 3 061 743 published on Jul. 13, 2018 owned to the applicant, it is noted that the stratification valve 13 is pressed against the end of the gas ejection conduit 76 when the pressure prevailing in the combustion chamber 5 is greater than the pressure prevailing in the ignition pre-chamber 71.

In this particular configuration of the ignition insert with an active pre-chamber 1 according to the invention, a magnetic field source 44 can be positioned on the cylindrical insert body 70 to produce a magnetic field which tends to maintain the stratification valve 13 pressed against the end of the gas ejection conduit 76 as explained in patent application No. 18 58111 dated Sep. 10, 2018 owned to the applicant. In this case, the cylindrical insert body 70 advantageously consists of all or part of a magnetic material 43.

As shown in FIGS. 1 to 5, the magnetic field source 44 can be a permanent magnet 53 which can be fixed by no mechanical means to the cylindrical insert body 70 and can remain in position on the latter only because of its magnetic sticking.

Alternatively, the magnetic field source 44 may consist of a coil of conductive wire which produces a magnetic field when said wire is crossed by an electric current. This particular configuration makes it possible for example not to return the stratification valve 13 pressed against the end of the gas ejection conduit 76 during the cold start of the internal combustion engine 2, which makes it possible to supply the ignition pre-chamber 71 with a fuel mixture not by means of the injector 8, but directly by the gas ejection orifices 24 via the gas ejection conduit 76, said mixture coming from the combustion chamber 5.

As illustrated in FIGS. 1 to 5, the gas ejection conduit 76 can be made of magnetic material 43 and form, at its contact with the stratification valve 13, a gas ejection tube 89, the outside diameter of which is less than that of said valve 13, said tube 89 being tightly enclosed in a non-magnetic sleeve 85 made of a non-magnetic material 50.

The non-magnetic sleeve 85 makes it possible to prevent the stratification valve 13 from getting across in its housing and this, by forcing the magnetic flux produced by the magnetic field source 44 to generate field lines which are not parallel to the stratification valve 13 on the periphery of the latter.

It is to be noted that the non-magnetic sleeve 85 can be mainly made of copper which has a high thermal conductivity, and be mounted tight by bracing around the gas ejection tube 89 to ensure maximum thermal cohesion between itself and said tube 89.

It is further noted that the stratification valve 13 may be flat to form a plane seal contact with the end of the gas ejection conduit, which avoids locating said valve 13 radially unlike a conical seat does.

Said planar contact also has the advantage of leaving a maximum cross-section for the passage of gases with the same lift of the valve 13 when the latter is open 76, that is to say when it rests on the valve seat on the chamber side 21 with which it cooperates.

In addition, the periphery of the stratification valve 13 can advantageously be troncospheric and not cylindrical, which makes it possible to prevent any jamming of said valve in its housing, whatever its orientation relative to the gas ejection tube 89 with which it cooperates.

As can be seen in FIGS. 1 to 5, the stratification valve 13 can be planar on its two faces so that its manufacture is simplified.

As shown in FIGS. 1 to 5, the pre-chamber nose 75 can consist of an attached nose 90 which covers the gas ejection conduit 76, the gas ejection orifice 24 being arranged in said attached nose 90.

It is noted that the attached nose 90 makes it possible, if necessary, to introduce a stratification valve 13 into the pre-chamber nose 75 as provided for in the patent application No. FR 3 061 743.

In the case where said valve 13 is returned by a magnetic field source 44 as described in patent application No. 18 58111, it is possible to choose for the attached nose 90 a non-magnetic material 50 such as copper which has furthermore a high thermal conductivity.

It is noted that the attached nose 90 can be mounted tight by bracing around the gas ejection tube 89 to ensure maximum thermal cohesion between itself and said tube 89, or around said tube 89 already tightly enclosed by a sleeve 85 made of a non-magnetic material, as shown in FIGS. 1, 2, 4 and 5.

It is also to be noted in FIGS. 3 and 4 that the attached nose 90 may have a support flange 91 which is held tight between the insert support surface 80 and the insert support shoulder 79 when the cylindrical insert body 70 is correctly positioned in the insert well 72.

According to an alternative embodiment of the ignition insert with an active pre-chamber 1 of the invention particularly understandable in FIGS. 1, 2, 5 and 6, a space forming an insert cooling water chamber 86 can be formed between the cylindrical insert body 70 and the insert well 72, cooling water coming for example from the cylinder head 3 which can circulate in said water chamber 86.

It is to be noted in FIGS. 1 to 5 that at least one well seal 26 can be provided placed between the cylindrical insert body 70 and the insert well 72 which prevents cooling water from exiting outside the cylinder head 3 while at least one other seal prevents said water from entering the combustion chamber 5.

It is also noted that the injector lateral well 73 may consist of a perforated or non-continuous bore which communicates along its length with at least one cylinder head cooling water chamber 41 which comprises the cylinder head 3. This particular configuration allows the insert well 72 to communicate with said water chamber 41.

In this case and as shown in FIGS. 1, 2, 5 and 6, the injector nose body 16 is immersed for part of its length in the cooling water contained in said water chamber 41. According to this particular alternative embodiment of the ignition insert with an active pre-chamber according to the invention, the diameter of the injector lateral well 73 can advantageously be provided significantly larger than that of the injector nose 16 which it houses so the cooling water can pass freely around said nose 16 to enter or exit the insert well 72.

It is noted in this respect that advantageously, the injector lateral well 73 can pass right through the insert well 72 to allow cooling water to circulate between said well 72 and at least two cylinder head cooling water chambers 41 which comprises the cylinder head 3.

As another alternative embodiment of the ignition insert with an active pre-chamber 1 according to the invention which is particularly visible in FIGS. 2 to 5, the insert clamping ferrule 74 can bear on the clamping face 84 for clamping by the ferrule, by means of a restraint spring 87, the latter guaranteeing on the one hand, an effort to maintain the insert support surface 80 on the insert support shoulder 79 approximately constant and, on the other hand, a good seal between said surface 80 and said shoulder 79, in all circumstances.

It is advantageously noted that the restraint spring 87 can be designed as at least one well-known "Belleville" washer, or at least one wavy spring washer.

It is also noted that the restraint spring 87 can make it possible to replace the well internal thread 82 and the ferrule external thread 81 by a simple groove arranged in the insert well 72 and in which is housed a stop junction part, said junction part bearing in said groove on the one hand and on the insert clamping ferrule 74 on the other hand.

It is to be noted that such an assembly requires a press to compress the restraint spring 87 during assembly of the stop junction part.

In FIG. 5, it has been shown that the insert support surface 80 can directly or indirectly form a ball joint connection with the insert support shoulder 79 while the cylindrical insert body 70 forms directly or indirectly a ball joint connection with the clamping means 74.

This particular configuration of the ignition insert with an active pre-chamber 1 according to the invention allows the cylindrical insert body 70 to be freely oriented relative to the cylinder head 2.

As shown in FIG. 5, the insert support surface 80 can for example be troncospherical in relief, while the insert support shoulder 79 can be hollow conical.

FIG. 5 also illustrates that the clamping means 74 can bear on the cylindrical insert body 70 by means of a ball-joint sliding washer 92 which can move radially either relative to the cylindrical insert body 70, or relative to the clamping means 74.

According to a particular embodiment of the ignition insert with active pre-chamber 1 according to the invention also shown in FIG. 5, the ball-joint sliding washer 92 can have, on the one hand, a planar contact surface facing the cylindrical insert body 70, and on the other hand, a hollow conical housing facing the clamping means 74, which housing cooperates with a troncospheric relief shape that have said means 74, said conical housing and said troncospheric shape forming a ball joint connection.

As shown in FIG. 5 and as an alternative embodiment of the ignition insert with an active pre-chamber 1 according to the invention, the ball-joint sliding washer 92 can be flexible and form a restraint spring 87 which avoids the loosening of the clamping means 74 and guarantees the pressing force for pressing the insert support surface 80 on the insert support shoulder 79 whatever are the differences in thermal expansion between the cylindrical insert body 70 and the insert well 72 which houses it.

It is to be noted that it is the axial compression, torsion and radial expansion of the ball-joint sliding washer 92 which give the latter the attributes of a restraint spring 87.

It will also be noted in FIG. 5 that the pre-chamber nose 75 may comprise a pre-chamber nose seal 93 made for example of elastomeric material, said seal 93 providing a seal between the combustion chamber 5 and the insert cooling water chamber 86, said seal 93 being protected from flames and hot gases present in the combustion chamber 5 by a pre-chamber nose fire segment 94.

In FIGS. 5 and 6, it has also been shown that the injector nose 16 can be kept pressed in the injector radial orifice 88 and against the cylindrical insert body 70 by elastic clamping means 95 which bear on the injector 8 on the one hand, and on the cylinder head 3 on the other hand.

According to this particular configuration, the end of the injector nose 16 can advantageously be troncospherical and rest in a conical seat arranged in the cylindrical insert body 70, at the injector radial orifice 88.

As a particular embodiment of the ignition insert with an active pre-chamber 1 according to the invention illustrated in FIG. 6, the elastic clamping means 95 may consist of a flange 96 which bears on the injector 8 on the one hand, and which is connected to the cylinder head 3 by at least one flange screw 97 on the other hand.

On said FIG. 6, it can be seen that flange springs 98 can advantageously be inserted between the flange 96 and the heads of the flange screws 97, said springs 98 possibly being "Belleville" washers known per se, or helical springs, or be of any type known to those skilled in the art.

Operation of the Invention:

The operation of the ignition insert with an active pre-chamber 1 according to the invention can easily be understood in view of FIGS. 1 to 6, which show a non-limiting exemplary embodiment of the invention, other alternative embodiments being possible.

As seen in FIGS. 1, 2 and 5, the cylindrical insert body 70 of the ignition insert with an active pre-chamber 1 mounts in the insert well 72, the latter having been provided instead of the spark plug well of the cylinder head of a conventional spark ignition engine.

Here, an insert well 72 has been arranged, the diameter of which at the cylindrical insert body 70 is twenty-four millimeters. It will be noted that this mounting can also be provided in place of the injector well of a conventional diesel engine.

According to the non-limiting example set out in FIGS. 1 to 5, the spark plug is intentionally compact. It can for example be a spark plug of the "Iridium Performance IY24" type from the "Denso" company which has a thread of eight millimeters in diameter and a hexagonal wrench engaging section of thirteen millimeters.

It can be seen in FIGS. 1 to 5 that, as an alternative embodiment, the ignition insert with active pre-chamber 1 according to the invention receives a stratification valve 13 kept pressed at rest against the end of the gas ejection duct 76 by a magnetic field produced by a magnetic field source 44.

For achieving the assembly shown in FIGS. 1, 2, 4 and 5, the cylindrical insert body 70 received a non-magnetic sleeve 85 which was braced by temperature difference on the gas ejection tube 89, and then, the assembly was covered with an attached nose 90 also mounted by bracing, the stratification valve 13 having been previously introduced into said nose 90.

This done, the cylindrical insert body 70 has been introduced into the insert well 72 shown in FIGS. 1, 2 and 5 until its insert support surface 80 comes into contact with the insert support shoulder 79 via the support gasket 25 and, according to this non-limiting exemplary embodiment, via a support collar 91 which the attached nose 90 exhibits. Then, said body 70 has been rotated about its longitudinal axis until the injector radial orifice 88 thereof be aligned with the injector lateral well 73 arranged in the cylinder head 3.

Then, the injector nose 16 was introduced into the injector lateral well 73 until said nose 16 be inserted in the ignition pre-chamber 71 at the desired depth.

It is to be noted that according to the embodiment of the ignition insert with active pre-chamber 1 according to the invention shown in FIGS. 1 to 6, the injector lateral well 73 is oriented perpendicular to the axis of the cylindrical insert body 70. This orientation is provided here only by way of example. Indeed, the injector lateral well 73 and the injector radial orifice 88 with which it cooperates can be freely oriented relative to the axis of the cylindrical insert body 70 so that said well 73 does not interfere, or interfere as little as possible, with the essential components of the cylinder head 3, and does not disturb, or disturb as little as possible, the operation of said components.

Once these elements are in place, the restraint spring 87 was placed in the insert well 72 followed by the insert clamping ferrule 74, the latter having been screwed to a predetermined torque to ensure the pressure sought contact between the insert support surface 80 and the insert support shoulder 79, via the support gasket 25 and the support flange 91.

The insert cooling water chamber 86 that forms the space between the cylindrical insert body 70 and the insert well 72 has to be noted in FIGS. 1, 2, 5 and 6. Said chamber 86 allows—according to a particular embodiment of the ignition insert with active pre-chamber 1 according to the invention—to cool the cylindrical insert body 70.

Indeed, in fact, the combustion of the pilot charge 9 in the ignition pre-chamber releases heat which heats the cylindrical insert body 70. In the absence of sufficient cooling, the temperature of said body 70 could become excessive while thanks to the insert cooling water chamber 86, said temperature is maintained at an acceptable value.

Moreover, the insert cooling water chamber 86 also cools the gas ejection conduit 76, the gas ejection tube 89, the non-magnetic sleeve 85, and the attached nose 90. To this end, the non-magnetic sleeve 85 and the attached nose 90 can advantageously be made of alloyed copper, this material having a high thermal conductivity. Thus, and thanks to said high conductivity, heat is efficiently exported from the pre-chamber nose 75 in which the gas ejection orifices 24 are arranged, up to the insert cooling water chamber 86.

It is to be noted that the embodiment of the ignition insert with an active pre-chamber 1 according to the invention which has been described herein is non-limiting. In particular, the ignition insert with active pre-chamber 1 according to the invention is intended for all active pre-chambers, with or without a stratification valve 13 and with or without magnetic return of said valve 13.

It will also be noted that the ignition insert with active pre-chamber 1 according to the invention can be applied to other fields than the internal combustion engines, such as to gas nailers, guns, or any other device requiring the firing of a main charge by means of a pilot charge with the best possible efficiency.

The possibilities of the ignition insert with an active pre-chamber 1 according to the invention are not limited to the applications which have been described herein and it should moreover be understood that the above description has been provided only by way of example and that it in no way limits the field of the said invention from which one would not depart by replacing the execution details described by any other equivalent.

What is claimed is:

1. An internal combustion engine including an ignition insert with an active pre-chamber, the internal combustion engine having a cylinder head that covers a cylinder to form with a piston a combustion chamber into which a main charge can be introduced, said cylinder head housing an ignition pre-chamber into which a spark plug and an injector nose of at least one injector and into which a pilot charge can be introduced, said ignition pre-chamber being capable of communication with the combustion chamber successively via a gas ejection conduit and via at least one gas ejection orifice which opens into said combustion chamber via a pre-chamber nose, said ignition insert and the active pre-chamber comprising:

at least one cylindrical insert body formed of one or more parts and in which the ignition pre-chamber and the gas ejection conduit are arranged, said cylindrical insert body being housed inside an insert well, being indexed in rotation relative to the cylinder head, and ending with the pre-chamber nose which passes through a pre-chamber nose orifice, said insert well arranged in the cylinder head and having fixing means, and said insert well opening outside the cylinder head via an insertion orifice having a first diameter and also opening into the combustion chamber via the pre-chamber nose orifice having a second diameter smaller than said first diameter, the insertion orifice and the pre-chamber nose orifice being connected to each other by at least one insert support shoulder, said cylindrical insert body having an insert support surface which rests on the insert support shoulder;

at least one insert spark plug well arranged in the cylindrical insert body, parallel to an axis of said cylindrical insert body or at an acute angle with respect to said axis and at a center of said cylindrical insert body, said spark plug well opening at an end of the cylindrical insert body which is axially opposite the pre-chamber nose, and also opening in the ignition pre-chamber, said spark plug well receiving the spark plug or the injector nose;

at least one injector radial orifice arranged radially in the cylindrical insert body and in which is housed an end of the injector nose or an end of the spark plug, said injector radial orifice connecting the ignition pre-chamber and/or the gas ejection conduit with an external surface of the cylindrical insert body;

at least one injector lateral well arranged in the cylinder head, said injector lateral well receiving an injector nose body or the spark plug and connecting an outside of the cylinder head with the insert well, the injector radial orifice aligned with said insert well so that the end of the injector nose or of the spark plug opens into the ignition pre-chamber and/or the gas ejection conduit by successively passing through the injector lateral well and the injector radial orifice; and clamping means in cooperation with the fixing means in order to maintain the insert support surface of the cylindrical insert body pressed against the insert support shoulder, wherein the pre-chamber nose houses a stratification valve which is pressed either against the end of the gas ejection conduit to close the gas ejection conduit in a sealed manner, or, against a valve seat on the chamber side to form with the gas ejection conduit a pre-chamber for ignition by torch which simultaneously communicates with the ignition pre-chamber via the gas ejection conduit and with the combustion chamber via the gas ejection orifice, and wherein a magnetic field source is positioned on the cylindrical insert body and produces a magnetic field which tends to maintain the stratification valve pressed against the end of the gas ejection conduit.

2. The internal combustion engine including an ignition insert with an active pre-chamber according to claim 1, wherein the gas ejection conduit is formed of a magnetic material and forms at a contact of the gas ejection conduit with the valve stratification a gas ejection tube whose outer diameter is less than that of said valve, said tube being tightly enclosed in a non-magnetic sleeve made of a non-magnetic material.

3. The internal combustion engine including an ignition insert with an active pre-chamber according to claim 1, wherein the pre-chamber nose comprises an attached nose which covers the gas ejection conduit, the gas ejection orifice being arranged in said attached nose.

4. The internal combustion engine including an ignition insert with an active pre-chamber according to claim 1, wherein the cylindrical insert body forms with the insert well a space forming an insert cooling water chamber.

5. The internal combustion engine including an ignition insert with an active pre-chamber according to claim 1, wherein the injector lateral well comprises a perforated or non-continuous bore which communicates over a length of the bore with a cylinder head cooling water chamber of the cylinder head.

6. The internal combustion engine including an ignition insert with an active pre-chamber according to claim 1, wherein the clamping means comprises of at least one insert clamping ferrule which has a ferrule external thread cooperating with the insert well fixing means which is formed of a well internal thread, said ferrule being bored at a center of said ferrule to let the spark plug pass through.

7. The internal combustion engine including an ignition insert with an active pre-chamber according to claim 6, wherein the insert clamping ferrule bears on a clamping face for clamping by the ferrule, via a restraint spring.

8. The internal combustion engine including an ignition insert with an active pre-chamber according to claim 1, wherein the insert support surface directly or indirectly forms a ball joint connection with the insert support shoulder while the cylindrical insert body directly or indirectly forms a ball joint connection with the clamping means.

9. The internal combustion engine including an ignition insert with an active pre-chamber according to claim 8, wherein the clamping means bear on the cylindrical insert body by means of a ball-joint sliding washer which can move radially either relative to the cylindrical insert body, or relative to the clamping means.

10. The internal combustion engine including an ignition insert with an active pre-chamber according to claim 9, wherein the ball-joint sliding washer is flexible and forms a restraint spring.

11. The internal combustion engine including an ignition insert with an active pre-chamber according to claim 1, wherein elastic clamping means holds the injector nose pressed in the injector radial orifice and against the cylindrical insert body, by elastic clamping means bearing on the injector and on the cylinder head.

12. The internal combustion engine including an ignition insert with an active pre-chamber according to claim 11, wherein the elastic clamping means is formed of a flange which bears on the injector, and which is connected to the cylinder head by at least one flange screw.

* * * * *